J. INGELS.
SEEDING MACHINE.
No. 90,268. Patented May 18, 1869.
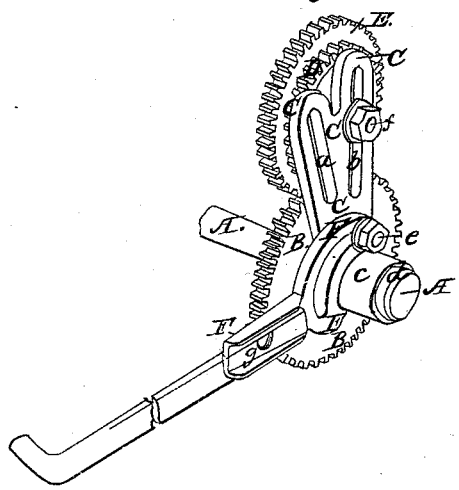
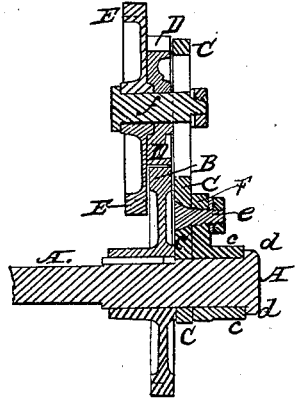
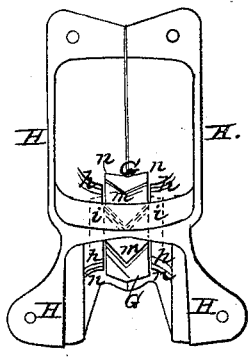
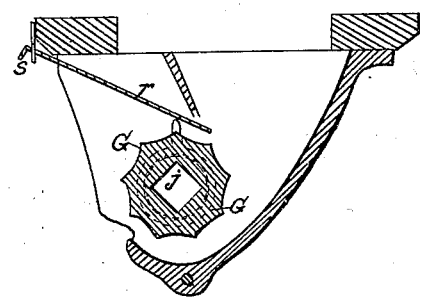
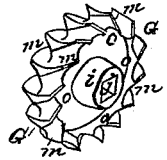
Witnesses.
Inventor.
Joseph Ingels
By atty A. B. Stoughton

United States Patent Office.

JOSEPH INGELS, OF MILTON, INDIANA.

Letters Patent No. 90,268, dated May 18, 1869.

---

IMPROVEMENT IN SEEDING-MACHINES.

---

The Schedule referred to in these Letters Patent and making part of the same.

---

*To all whom it may concern:*

Be it known that I, JOSEPH INGELS, of Milton, in the county of Wayne, and State of Indiana, have invented certain new and useful Improvements in Seeding-Machines; and I do hereby declare the following to be a full, clear, and exact description of the same, reference being had to the accompanying drawings, making a part of this specification, in which—

Figure 1 represents, in perspective, the manner of arranging the driving-gear, so as to be thrown out and into action by the acts of raising and lowering the seed-tubes, shoes, or spouts, as the case may be, as well as the combination therewith of the reversible gear, for changing the speed of the seeding-devices;

Figure 2 represents a section through the gear-arrangement, as shown in fig. 1;

Figure 3 represents a top plan of a seed-box and seeding-wheel used therein: and Figure 4 represents a section through the seed-box, cell, or cup, and the seed-wheel.

Figure 5 represents, in perspective, the seed-wheel removed from the box, cell, or cup, and of a somewhat modified or improved form over that shown in figs. 3 and 4.

Similar letters of reference, where they occur in the separate figures, denote like parts of the machine in all the drawings, and which drawings represent only such parts of a seeding-machine as my present invention relates to or is concerned with.

A may represent the main axle of any ordinarily-constructed seeding-machine that is carried on a pair of wheels, and drawn by a team, in the usual way.

On this axle A is arranged, so as to turn with it, a gear-wheel, B, and near this gear-wheel B, and upon the axle A, also, is placed, so as to turn on and independent of the axle, a slotted plate, C, which has in it two slots, *a b*, in one or in both of which the changeable gears D E are set, and adjusted to gear or run with the wheel B; and next to this slotted plate C is placed, over the axle A, another slotted and lever-plate, F, having a hub, *c*, upon it, which fits up against the shoulder *d* on the axle; and this latter plate F is bolted to the first-named slotted plate C by a screw-bolt, *e*, so that the two plates shall move together.

The journal *f* of the two reversible gears D E is adjusted and held in the slot *b* of the plate C, and these wheels may be changed for others of varying size, just as the kind of grain to be drilled, or planted, or the speed of the seed-wheels may require.

When the wheels used are very small, or of the smallest sizes, they may be used in the other slot, *a*, but might be used in *b*. Indeed one slot might answer for the whole series of gauge-wheels, of which there may be from eight to ten, or more or less, though the number named are capable of distributing the seed in some fifty different quantities, whilst the machine and the unchangeable parts may continue at a uniform speed.

The plate C must have width and strength enough to enable it to resist the strain of the gears, and having the width, the second slot is formed in it, as circumstances may render it useful, but it is not indispensable to the machine.

The plate F has cast upon it a recess, seat, or place, *g*, where a lever, shown by red lines, is placed, said lever being bent around at its extremity, which end enters a cam-slot on the bar that carries the seeding-tubes, or shoes, so that when said bar is moved on its pivoted points, it moves the lever, and the plates F C also, and the latter, carrying the gears D E, roll them around on the gear B, and in a circle, the centre of which is the axle A.

Over the wheel E is arranged a gear, which drives the shaft that carries the seeding-wheels G, and the rolling of the wheel E round its centre of motion moves it out of gear with the cog-wheel that drives the seed-wheel shaft, whilst it remains in gear with the wheel B. By this construction and arrangement of gears, the raising of the seed-tubes, or shoes, throws out the gears, and stops the seeding-devices while lowering the tubes, puts them into action again.

The two wheels D E, though not in one piece, always move together, as they come together by a clutching or dovetailing-device, which enables them to be easily separated when they are to be changed, which causes them to move together when one is driven only.

The seed-boxes, cups, or cells H, of which there are a series arranged on the machine, are cast in two parts, or sections, and on the opposite faces of the interior thereof are formed cheeks *h h*, which project therefrom, and embrace between them the seed-wheel G. of which there is one in each cup, box, or cell.

The seed-wheels G are cast with projecting hubs, *i*, and with an angular opening, *j*, through them, commonly square, so as to fit upon and turn with a square shaft.

The hubs, or trunnions *i*, of the seed-wheels have bearings, and turn in the sides or sections of the seed-box or cell.

The cogs, or projections *m*, on the seed-wheel extend beyond the cheek-pieces *h*, as shown at *n*, fig. 3, so that the grain may completely surround them; and the seed-wheel, moreover, as shown at *o*, in fig. 5, may be countersunk or recessed, to better adapt it to the cheeks *h h*, and to more fully develop the cogs, or projections, on the perimeter and sides of the wheel, which enables them to better take, carry, and deliver the grain.

The gear on the shaft of the seed-wheels is placed over the gear E, and can be driven by this latter wheel; or the gear D may be turned or reversed, so as to gear into and drive the seed-wheel shaft, it being adjusted so as to gear with it; or different-sized wheels may be substituted for those, D E, and may be rolled back or forth with their plate C, so as to gear with the wheel on the seed-wheel shaft, as the case may be.

The capability of the parts for the changeable and reversible or transposable gears admits of such changes of speed of the seed-wheels as will adapt the machine to the distributing of any and all of the kinds usually planted by farmers.

In the seed-boxes, or cells, are arranged slides, $r$, which, when slid up, as shown in fig. 4, admit free access of the grain to the wheel G; but when the seeding operation is ceased, or about to be, the slides are freed from the fastening, $s$, and allowed to run down and cover the portion of the cell, or box, that the seed falls into from the hopper, and thus form a cut-off between the supply and delivery of the grain.

Having thus fully described my invention,

What I claim therein as new, and desire to secure by Letters Patent, is—

1. In combination with the main gear B, the slotted plates C F, moving around the same centre with said gear B, for the purpose of carrying and controlling the intermediate changeable and reversible gears that drive the seed-wheels, substantially as and for the purpose described.

2. Also, in combination with the gears and the slotted plates, the lever and seat $g$, for the reception and attachment of a lever, by which they may be actuated, substantially as herein described.

3. Also, the seed-wheel, with its cogs, or projections $m$, and recesses $o$, substantially as and for the purposes described.

4. Also, in combination with the seed-wheel, and the cheeks in the seed-boxes, the projecting or extending of the cogs, or projections thereon beyond the body and cheeks, as shown at $n$, substantially as described.

JOSEPH INGELS.

Witnesses:
A. B. STOUGHTON,
H. L. JONES.